Oct. 7, 1924.
W. F. CONKLIN
DETACHABLE BOLT
Filed Sept. 20, 1921
1,510,978
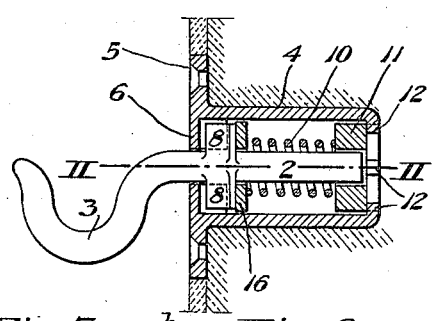
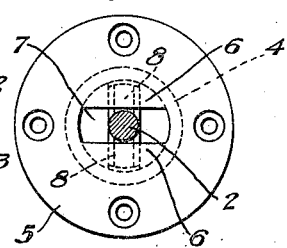
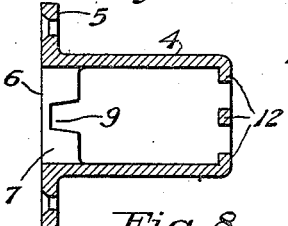
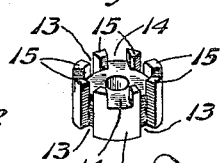
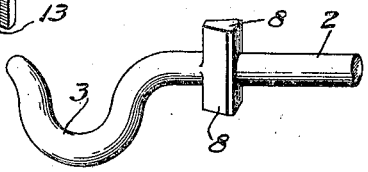
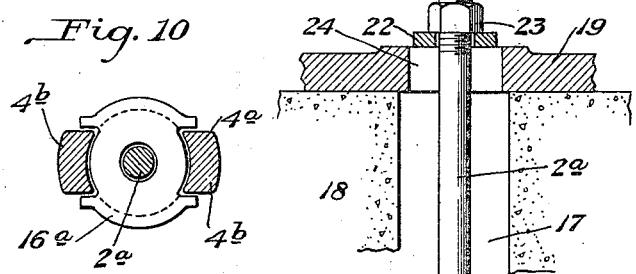
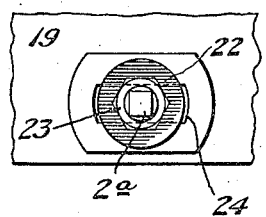
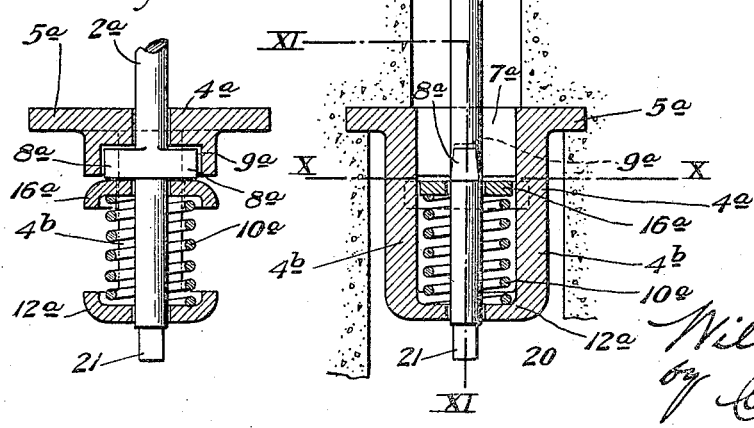
INVENTOR
William F. Conklin
by C. M. Clarke
atty.

Patented Oct. 7, 1924.

1,510,978

UNITED STATES PATENT OFFICE.

WILLIAM F. CONKLIN, OF TARENTUM, PENNSYLVANIA.

DETACHABLE BOLT.

Application filed September 20, 1921. Serial No. 502,022.

*To all whom it may concern:*

Be it known that I, WILLIAM F. CONKLIN, a citizen of the United States, residing at Tarentum, in the county of Allegheny and State of Pennsylvania, have invented certain new and useful Improvements in Detachable Bolts, of which the following is a specification.

My invention consists of an improvement in detachable bolts, and has for its object to provide a bolt or stem connection by which the shank of the bolt may be easily inserted or removed or fixedly held within a receiving socket. It comprises a special socket construction embodying an insertion or clearance opening for the locking lug or lugs of a key bolt, a socket or sockets therefor, and a spring operable to seat the lug in the socket for fixed engagement and capable of compression to admit of unseating and turning of the bolt and lug for clearance through the insertion opening, in insertion or removal.

The objects in view are to provide a simple and efficient means for inserting, locking and removing the inner end of a bolt or shank, capable of holding the bolt in securing position, either as an anchoring bolt, or in connection with any suitable outer terminal, for use in various ways or adaptations.

In the drawings illustrating the invention as utilized in certain of its various applications:

Fig. 1 is a central longitudinal sectional view showing the invention as applied to a wall hook;

Fig. 2 is a sectional view of the spring and bolt casing on the line II—II of Fig. 1, with the co-operating parts removed;

Fig. 3 is a face view of the casing showing the bolt in section;

Fig. 4 is a face view of the opposite end of the casing;

Fig. 5 is a perspective detail view of the spring retaining washer;

Fig. 6 is a similar detail view of the bolt when used as a hook;

Fig. 7 is an end view showing a modified form of casing;

Fig. 8 is a sectional view showing the use of the invention as applied to foundation bolts;

Fig. 9 is a plan view showing the outer terminal of the bolt;

Fig. 10 is a cross section on line X—X of Fig. 8;

Fig. 11 is a vertical section on line XI—XI of Fig. 8.

Referring to the construction of Figs. 1 to 7 inclusive, 2 is the removable bolt or shank having an outer hook terminal 3 for use in any suitable way as a hanger for picture frames, garments, etc. The casing or housing 4 is of any convenient shape, as a cylinder, adapted for mounting in a wall and of being secured thereto by screws through a flange 5 engaging studding or other incorporated backing or framing, as will be readily understood.

It is usually desirable that the casing 4 be inserted inwardly of the wall with its outer face flush with the wall surface, as shown, so that it may be covered with wall paper or the like, and in installing the casings they may be located at intervals and locations providing for selection wherever desirable as needed, by merely puncturing the paper for insertion of the bolt. In this way, the walls of a building may be equipped with any desired number of bolt receiving casings, and some or all of them may be put into service as required, or may be discontinued and others at different locations selected and used, by withdrawal and re-insertion of the bolt, as will be readily understood.

The front of the casing 4 is provided with a wall 6 which is laterally slotted at one or both sides of a middle bolt insertion opening at 7, for clearance of a lateral locking lug 8 of bolt 2. The drawings show two such lugs, providing in effect a continuous cross lug extending beyond the bolt at each side, and such is the preferable construction, although it will be obvious that the invention will be equally operative with a single lug. The front wall 6 extends backwardly and is recessed at one or both sides of the center, providing a socket or sockets 9 adapted to receive the lug or lugs 8 when the parts are in operative position.

The side faces of lugs 8 are tapered and enter between correspondingly tapering faces of the sockets 9 under expanding pressure of a spiral spring 10 to effect reverse movement with snug interfitting engagement and positive seating.

The rear end of casing 2 is open for insertion of a bayonet joint washer 11 providing a rear bearing for the spring 10 and held within the casing against spring pressure by inwardly extending lugs 12. These are regularly spaced around the end of the casing and engage clearance slots 13 of the washer when inserted until it is pressed against the spring sufficiently far to admit of partial rotation of the washer to bring the lugs 12 into register with retaining sockets 14 between projecting terminals 15 thereof, under reacting spring pressure. By this means, the spring resisting washer 11 is inserted, then partly turned, and released, after which it will be held against removal by the spring until depressed and rotated to bring the slots 13 again into register with the lugs 12.

It will be understood, of course, that any other suitable way of holding the washer in place may be substituted, as by merely crimping over the end of the casing, and I do not wish to be limited to the particular construction shown in this respect.

A washer 16 is interposed between the other end of the spring 10 and the inwardly projecting portions of end wall 6 at each side of socket 9, providing a bearing for the inner face of lugs 8 when the bolt is inserted in position in casing 4. Said washer is inserted edgewise through opening 7 or it may be peripherally apertured for clearance of lugs 12 in inserting from the other end, as at 13, Fig. 5. The spring, being retained between washer 16 and the fixedly held resisting washer 11, is subject to inward pressure of the lugs 8 sufficiently far to allow of rotation of the lugs inwardly beyond the flanking sides of socket 9, whereby the lugs may be brought into register with the socket so as to seat therein under spring pressure and thrust the tapered faces of the lugs into tight holding engagement between the tapered faces of the sockets.

In such position, the bolt and its outer hook or other terminal will be fixedly held against dislodgement until it is pushed back and again partially rotated to bring the lugs into register with the clearance slot 7, when the bolt may be withdrawn. Each washer 11 and 16 is provided, as shown, with the central receiving and bearing hole for the stem or shank 2 of the bolt so that it will be held in alinement thereby, the washers themselves fitting loosely within and being held concentrically by the casing 2.

In Fig. 7, I show a modified construction in which the casing 4 is provided with a securing flange or base $5^b$ arranged across its side instead of the end for convenience in mounting to suit different local conditions, the construction otherwise being the same as already described.

The construction and operation of the device as above described will be clearly understood. It permits of the location of the casing 4 at any desired position and in any number of places so that when used, all that is necessary is to expose the front slotted opening 7, insert the bolt 2 with the lugs 8 in register with the slot, pushing the bolt inwardly sufficiently far to clear the rear faces of the front wall, then rotating the bolt until the lugs are in registering position with the sockets, and releasing inward pressure, when the spring will seat the lugs and continuously hold them in such position.

In Figs. 8 to 11 inclusive, I have shown the invention as utilized in connection with a foundation bolt $2^a$, which may be of any length, extending downwardly through a suitable opening 17 in the foundation 18 of concrete or other suitable material, for the purpose of securing an upper bed plate or other supporting element 19 upon the foundation and in fixed connection therewith, by interlocking connection with the lower casing $4^a$. Said casing is generally similar to casing 4 above described, having a flange $5^a$ or other suitable anchoring extension whereby it may be fixedly set and incorporated with the lower portion of the foundation, preferably within easy reach of a clearance space 20 for the workman. Casing $4^a$ in such case has a lower terminal spring-supporting bottom or integral washer $12^a$ adapted to provide a bearing for the lower end of spring $10^a$, and connected with the upper portion of the casing by the side members $4^b$, providing a clearance space at each side for insertion of an upper spring bearing washer $16^a$.

The upper portion of casing $4^a$ is provided with a receiving socket $9^a$ preferably having inwardly tapered side faces between the inwardly extending upper wall portions adapted to cooperate with the transverse lug members $8^a$ of bolt $2^a$. The construction of the casing and its several parts as to the interlocking socket and lug is practically the same as above described, and operable in substantially the same way. Each end of bolt $2^a$ is provided with a squared terminal 21 by which the bolt may be turned in locating it from the upper end, and also held or turned by a wrench at the lower end when necessary. The bolt having been inserted downwardly and rotated to bring the lug and slot into register, the pressure of the spring $10^a$ operates to seat the lugs upwardly in fixed holding position. Thereafter, a washer 22 and nut 23 are applied to the upper threaded terminal of the bolt so as to ensure tight holding connection in the usual way. Removal of the bolt is effected by removing said washer and nut, depressing the bolt and rotating it to bring the lugs $8^a$ into register with the transverse clearance slot $7^a$, when the bolt may be withdrawn through the corresponding clearance slots 24 in bed plate 19.

In the event of breakage or severance of bolt $2^a$, the upper section may be withdrawn and the upper end of the lower section may be grasped with any suitable wrench or tongs, depressed, and turned, and then withdrawn, as described, or it may be merely depressed from the upper end and rotated by the squared lower terminal 21 until the lugs are released, and then withdrawn, as will be readily understood.

The application of the invention to holding bolts for foundations or the like in the manner described obviates the trouble and expense of removing the usual ordinary bolt in case of breakage, frequently involving the necessity of cutting the bolt into sections because of impossibility of removing a lower nut due to rust, and obviating the usual attendant difficulty of operating in contracted or inaccessible locations.

The invention admits of the location of the locking casing at any desired positions and the easy insertion and removal of bolts of any length with the accompanying advantage in economy of time and labor.

Various other adaptations of the invention may be made and the bolt 2 or 2$^a$ may be utilized in connection with any supplemental attachments in place of the hook 3, or otherwise utilized, as will be readily suggested to the user. Various changes or modifications may be made in the invention in different details of construction or otherwise by the skilled mechanic, but all such changes are to be considered as within the scope of the following claims.

What I claim is:

1. A detachable bolt construction comprising a casing provided with a front wall having a slotted opening and a rear holding socket at an angle thereto, a bolt having a lateral locking lug adapted to pass through the slotted opening and rotate into register with the rear socket, and a spring tending to normally press the bolt and lug outwardly.

2. A detachable bolt construction comprising a casing provided with a front wall having a slotted opening and a rear holding socket, at an angle thereto, a bolt having a lateral locking lug adapted to pass through the slotted opening and rotate into register with the rear socket, a spring surrounding the bolt and restrained against inward movement by the rear end of the casing, and a washer between the spring and the locking lug.

3. In combination, a supporting housing having a rear abutment and a front slotted wall provided with an inner holding socket, a bolt having a lateral locking lug adapted to pass through the slotted wall and to engage the inner socket, and a spring for pressing the bolt outwardly.

4. In combination, a supporting housing having a rear abutment and a front slotted wall provided with an inner holding socket extending laterally at each side of the wall slot, a bolt having cooperating laterally extending locking lugs adapted to pass through the slotted wall and to be rotated to engage the inner socket, a spring within the housing opposed by its inner end, and a washer between the outer end of the spring and the front wall.

5. In combination, a supporting housing having a rear centrally apertured abutment mounted within the housing, a front wall having a cross slot and provided with an inner angularly located tapered holding socket, a bolt having laterally extending tapered locking lugs adapted to pass through the slotted wall and to engage the inner socket, a spring within the housing bearing against said abutment, and a washer between the other end of the spring and the inner face of the front wall adapted to engage and exert pressure upon the locking lugs when the bolt is inserted.

6. In combination, a supporting housing having a rear abutment and a front slotted wall provided with an inner holding socket extending laterally at each side of the wall slot, a bolt having cooperating laterally extending locking lugs adapted to pass through the slotted wall and to be rotated to engage the inner socket, and an inner shank extension, a spring surrounding the shank extension within the housing and a rear bearing therefor, and a washer between the outer end of the spring and the front wall.

In testimony whereof I hereunto affix my signature.

WILLIAM F. CONKLIN.